(12) United States Patent
Novak et al.

(10) Patent No.: US 9,996,185 B2
(45) Date of Patent: Jun. 12, 2018

(54) PREVENTING THE AUTOMATIC DISPLAY OF AN ONSCREEN KEYBOARD

(71) Applicant: Lenovo (Singapore) Pte. Ltd., Singapore (SG)

(72) Inventors: Joshua Neil Novak, Wake Forest, NC (US); Jianbang Zhang, Cary, NC (US); Jason Peter Sallinger, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 49 days.

(21) Appl. No.: 14/815,398

(22) Filed: Jul. 31, 2015

(65) Prior Publication Data
US 2017/0031494 A1 Feb. 2, 2017

(51) Int. Cl.
*G06F 3/041* (2006.01)
*G06F 3/0488* (2013.01)
*G06F 3/0354* (2013.01)
*H04M 1/725* (2006.01)

(52) U.S. Cl.
CPC ........ *G06F 3/0416* (2013.01); *G06F 3/03545* (2013.01); *H04M 1/72519* (2013.01); *G06F 3/04886* (2013.01); *H04M 2250/70* (2013.01)

(58) Field of Classification Search
CPC ............. G06F 3/04886; G06F 3/04883; G06F 3/0236; G06F 3/0238; G06F 3/0481; G06F 3/16; G06F 3/011; G06F 3/0416; G06F 3/03545
See application file for complete search history.

(56) References Cited

U.S. PATENT DOCUMENTS

| | | | | |
|---|---|---|---|---|
| 7,224,991 | B1* | 5/2007 | Fuoss | H04W 4/12 345/173 |
| 7,308,652 | B2* | 12/2007 | Comfort | G06F 21/31 715/702 |
| 7,692,636 | B2* | 4/2010 | Kim | G06F 3/04883 345/156 |
| 2002/0196274 | A1* | 12/2002 | Comfort | G06F 21/31 715/741 |
| 2005/0210402 | A1* | 9/2005 | Gunn | G06F 3/0236 715/773 |
| 2006/0071910 | A1* | 4/2006 | Kim | G06F 3/04883 345/173 |
| 2007/0097095 | A1* | 5/2007 | Kim | G06F 1/1613 345/173 |
| 2012/0306927 | A1* | 12/2012 | Lee | G06F 3/041 345/660 |
| 2015/0089389 | A1* | 3/2015 | Cohen-Zur | H04W 4/12 715/752 |
| 2015/0205520 | A1* | 7/2015 | Yim | G06F 3/0484 715/268 |
| 2015/0309720 | A1* | 10/2015 | Fisher | G06F 3/04845 715/752 |

* cited by examiner

*Primary Examiner* — Md Saiful A Siddiqui
(74) *Attorney, Agent, or Firm* — Ference & Associates LLC

(57) ABSTRACT

One embodiment provides a method, including: detecting, using a processor, an input method editor application is running on a device; detecting, using a processor, a data entry field is active; and responsive to detecting the input method editor application is running and the data entry field is active, suppressing, using a processor, an on screen keyboard from being displayed on a display device.

18 Claims, 4 Drawing Sheets

US 9,996,185 B2

PREVENTING THE AUTOMATIC DISPLAY OF AN ONSCREEN KEYBOARD

BACKGROUND

Information handling devices ("devices"), for example cell phones, smart phones, tablet devices and the like, have communication capabilities, including messaging application functionality. Users input text (whether via key inputs or other modes, e.g., handwriting inputs converted to text) into a communication or like application using an input component, e.g., a soft (onscreen) keyboard, a mechanical keyboard, etc.

In some devices (e.g., tablet computing devices) the user relies primarily on a touch screen or "soft" keyboard (onscreen keyboard, OSK), which may be used to provide key strokes. In some devices, an input method editor (IME) may be used to interpret handwritten ink strokes as input characters in addition to a more conventional soft keyboard. In still other devices (e.g., tablet with detachable keyboard, laptop computer, etc.) a pen or stylus may also be utilized to interface with the device, e.g., in connection with a digitizer or touch screen responsive to pen or touch input, even though other input modes are available (e.g., physical keyboard).

BRIEF SUMMARY

In summary, one aspect provides a method, comprising: detecting, using a processor, an input method editor application is running on a device; detecting, using a processor, a data entry field is active; and responsive to detecting the input method editor application is running and the data entry field is active, suppressing, using a processor, an on screen keyboard from being displayed on a display device.

Another aspect provides an information handling device, comprising:
 a processor; a memory device that stores instructions executable by the processor to: detect an input method application is running on a device; detect a data entry field is active; and responsive to detecting the input method editor application is running and the data entry field is active, suppress an on screen keyboard from being displayed on a display device.

A further aspect provides a product, comprising: a storage device having code stored therewith, the code being executable by a processor and comprising: code that detects an input method editor application is running on a device; code that detects a data entry field is active; and code that, responsive to detecting the input method editor application is running and the data entry field is active, suppresses an on screen keyboard from being displayed on a display device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
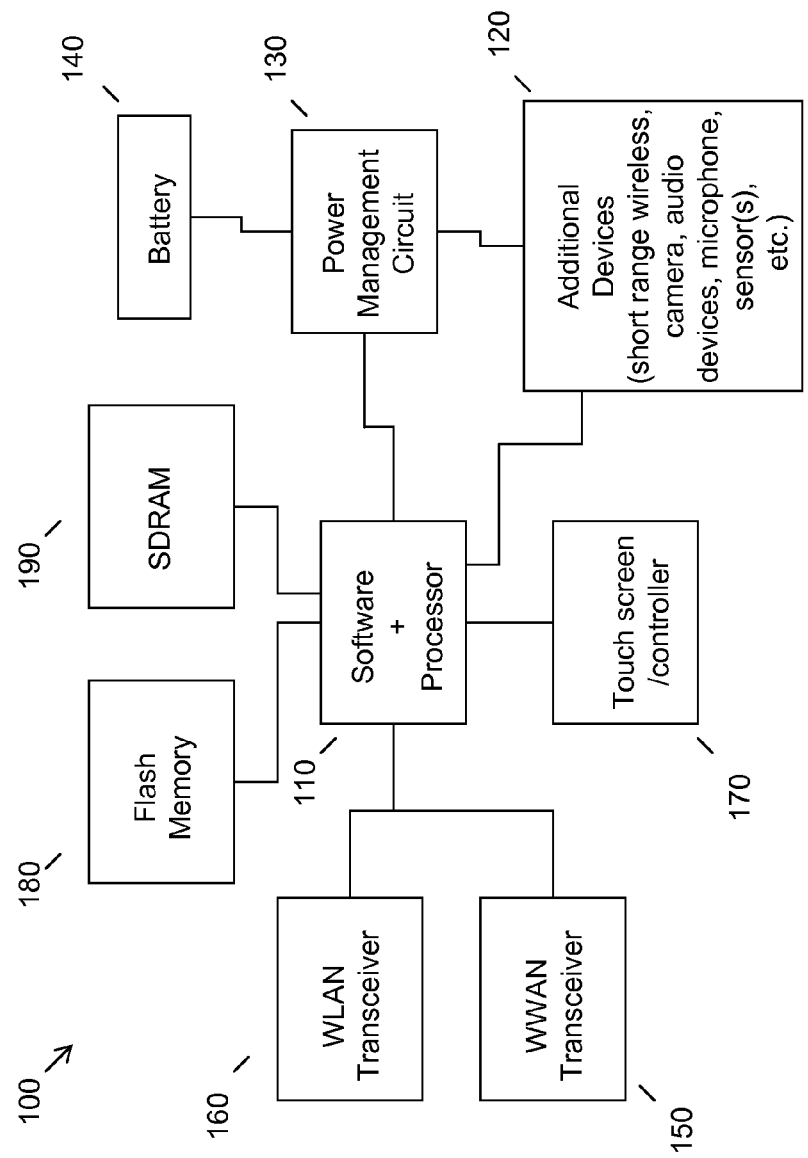
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Most current operating systems have the ability to detect when a user enters a text input field (e.g., a username field on a website, editable area on a form, etc.). On a typical laptop or computer, a user would simply use the attached physical keyboard for data entry. However, when a physical keyboard is not present (e.g., a tablet, smartphone, etc.) it is typical for the operating system (OS), to automatically display an on screen keyboard (OSK) for the user to enter input. In order to utilize an on screen keyboard, a display device is required to sacrifice a large portion of display real estate to accommodate the OSK.

This can cause a variety of issues related to data entry (e.g., inability to see user entered data, inability to select additional entry fields, etc.). These issues can be greatly exaggerated on smaller screens, like those on smart phones or mini-tablets. In order to combat the screen space issues associated with an OSK, a device may allow a user to enter data through some other input method (e.g., handwriting data, voice data, etc.). However, this solution creates additional problems of its own. For example, if a device has the ability to determine if the user can write directly into the text field with a pen or finger, an embodiment may then hide the OSK so that the user will not be disturbed or interrupted by the launching of the OSK.

Ideally, the solution would allow for an individual response based on the existing circumstances of each device. Additionally, once the user stops writing, the OSK should be returned back to a default setting to ensure that the user can enter data normally during the next instance.

Thus, an embodiment, takes into account, many different factors. It should be noted that the following list of factors is not to be considered limiting, and one skilled in the art would recognize that other factors exist. An embodiment may first, determine if the user has the ability to write directly into text fields (e.g., does the user have write access to the document). Additionally, an embodiment may determine if a text field currently has focus (e.g., a user has selected the text field) such that any entered machine text will be input into it. An embodiment may also consider whether or not the currently active application has the capability to accept input using an OSK. If an application is unable to accept input from a software keyboard (e.g., an OSK), then no further action is required by the embodiment. The final example factor an embodiment may consider is what method of entry is being utilized (e.g., a finger or one of the many types of stylus available). This factor can be crucial as some stylus/touch surfaces have the ability to detect each other without actual contact (e.g., detecting if the stylus is within "hover range"). Thus, it can be determined if imminent use of the pen is about to take place.

The technical issue presents problems for a user in it makes it difficult to fully utilize the majority of mobile devices. As the devices become more sophisticated, more advanced methods of data entry will become available. Thus, the embodiments disclosed herein provide a much more convenient system for non OSK user input. Given the variety of factors disclosed herein, a decision may be made that determines a user is going to enter data into a text field using a method other than the OSK (e.g., hand writing input, voice input, etc.).

Accordingly, an embodiment provides a method of detecting if an input method editor (input application) is running on a device (e.g., hand writing recognition software, voice recognition software, etc.). Additionally, the embodiment detects if a data entry field is present and if that data entry field is selected (e.g., a username or password blank on a website). If both of these criterion are met, an embodiment then prevents the on screen keyboard from being displayed on the device. Additionally or alternatively, the embodiment may require additional factors to be satisfied such as those discussed herein (e.g., determining if the OSK would be displayed, detecting a stylus or pen within a predetermined distance from the touch surface, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
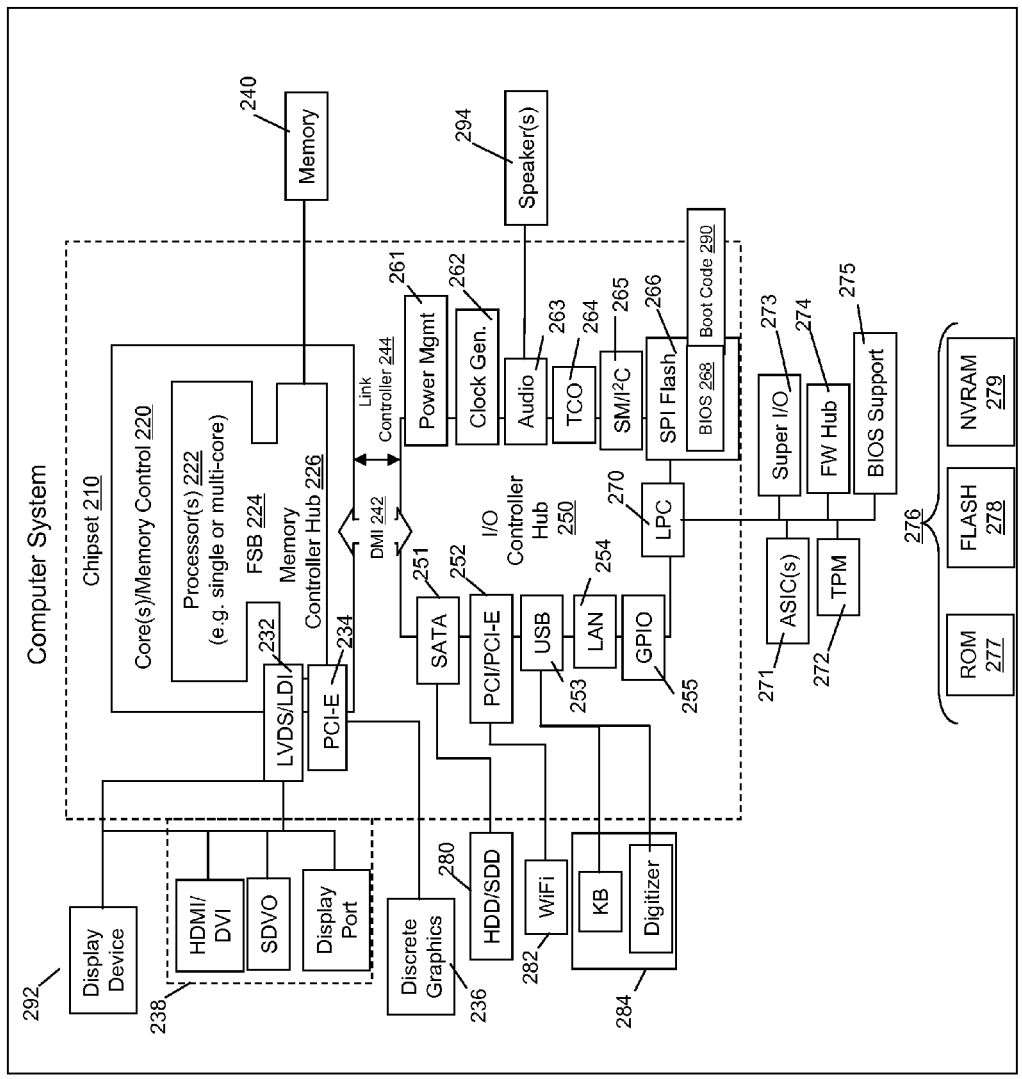
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to input data into an active data field. For example, the circuitry outlined in FIG. 1 may be implemented in a tablet or smart phone embodiment, whereas the circuitry outlined in FIG. 2 may be implemented in a personal computer embodiment.

Figure 3:
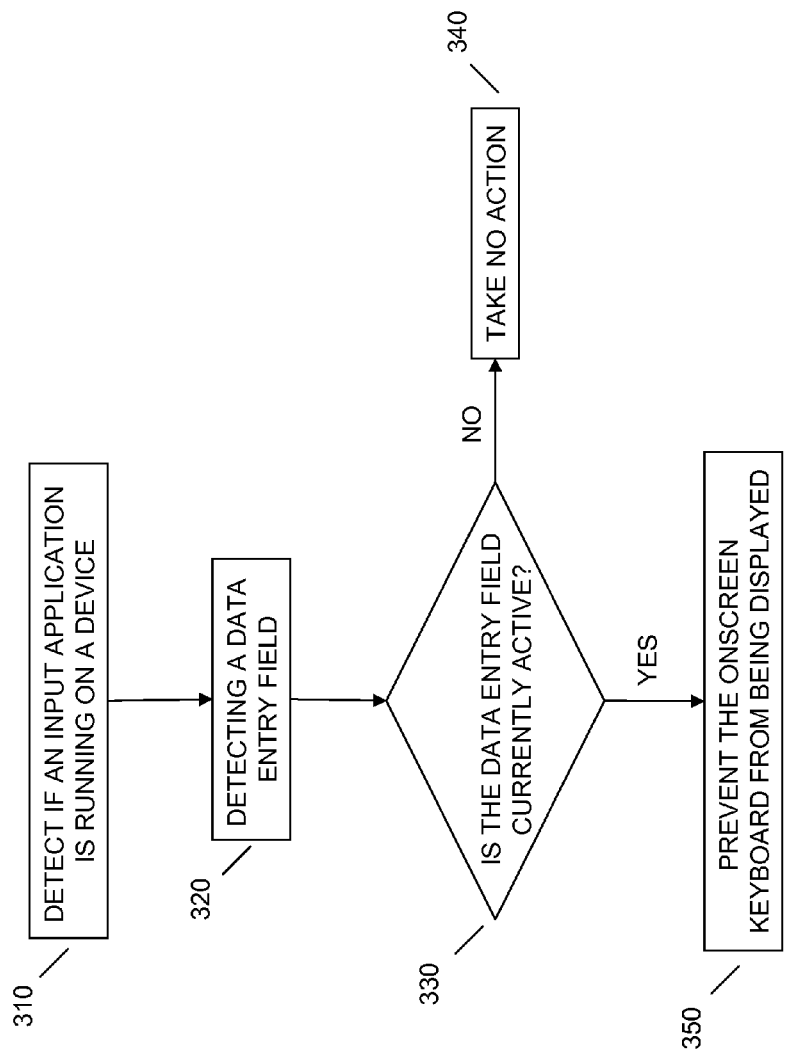
FIG. 3 illustrates an example method of preventing the automatic display of an onscreen keyboard.

Referring now to FIG. 3, an embodiment detects if an input application is running on a device at 310. The application may be a system level application. Thus, an embodiment may be built into any typical application (e.g., word processors, web browsers, form applications, etc.). Additionally or alternatively, an embodiment may also allow the application to run in the background, thus running as an overlay to any active application. For example, the application may be running in the background while a user interacts with a web browser or other application.

After checking to determine if an input application is running at 310, an embodiment detects if a data entry field is present at 320. A data entry field is any field that can accept machine text data (e.g., a word document, a PDF field, etc.). In addition to determining that a data entry field exists, an embodiment determines if the field is active at 330 (i.e., the current focus of user input). For example, if as previously stated a user is interacting with a web browser and reaches a login screen on a particular website, the user then selects (e.g., using a mouse, finger, stylus, etc.) the username entry box. This selection allows a user to enter their username in order to log into the website.

If the data entry field is determined not to be active, an embodiment will take no action at 340. This is because, typically, an OSK will not be displayed until a user actively interacts with a data entry field that accepts machine text. Additionally, an embodiment may detect if the OSK is anticipated to be displayed when a data field is selected or alternative activity triggering an OSK takes place. Thus, if the current application or activity does not require an OSK and thus would not prompt the OS or application to display one, an embodiment would not be required to take any action to prevent the displaying of the OSK.

However, an additional embodiment may prevent the onscreen keyboard from being displayed even if the data entry field is not active. This ability is application specific, and may be required for applications that prompt for the display of an OSK even when the user is not currently, or in preparation, to enter machine text. For example, an application may, as a function of its programming, request the OSK to be displayed at all times. In such an instance, an embodiment would still prevent the OSK from being displayed even though no data field is active. This ensures the user is still able to locate and interact with possible data fields within the application without an obstructed view.

Alternatively, if the data entry field is determined to be currently active at 330, an embodiment will prevent the onscreen keyboard from being displayed at 350. Once the OSK is prevented from being displayed, a user may freely interact with the application or data entry fields they desire. An embodiment then accepts a form of user input (e.g., handwriting, voice, etc.). The current embodiment will be described herein using handwriting input for simplicity purpose, however one skilled in the art would realize alternate methods may exist. Thus, an embodiment may accept on a touch surface (e.g., a tablet, smartphone, etc.) handwriting input. The hand writing input is then converted into machine text which can be interpreted by a computer and inserted into an active data field. The converted text is then inserted into the active data field as the user desires.

In one embodiment, the hand writing input may be accepted at a particular location on the touch surface. For example, the handwriting input may be received at a predetermined zone for data entry such as the lower right corner, the specific area may additionally be distinguishable visually (e.g., a highlighted area, or rectangular area with colored backfill). Additionally or alternatively, an embodiment may receive the handwriting input at the location of the active data entry field (i.e., directly on top of the desired location of the machine text). This allows for an intuitive and unobtrusive entry method.

Figure 4:
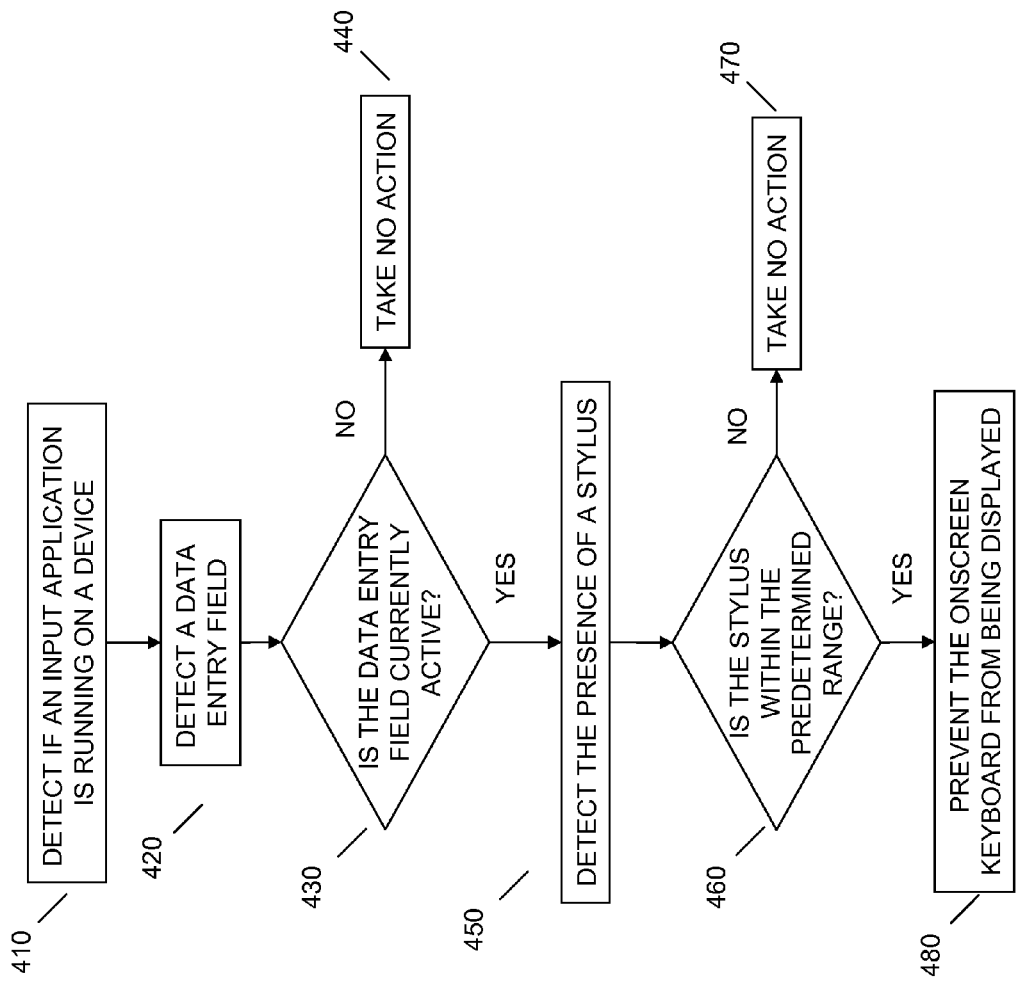
FIG. 4 illustrates another example of preventing the automatic display of an onscreen keyboard.

Now referencing FIG. 4, an embodiment similar to FIG. 3, detects if an input application is running on a device at 410. The application may be a system level application separate from the operating system. Thus, an embodiment may be built into any typical application (e.g., word processors, web browsers, form applications, etc.). Additionally or alternatively, an embodiment may also run in the background, thus acting as an overlay to any active application. For example, the application may be running in the background while a user interacts with a web browser or other application that may require a user to input machine text.

After checking to determine if an input application is running at 410, an embodiment detects if a data entry field is present at 420. A data entry field is any field that can accept machine text data (e.g., a word document, a PDF field, etc.). In addition to determining that a data entry field exists, an embodiment determines if the field is active at 430 (i.e., the current focus of user input). For example, if a user is interacting with a web browser, and reaches a login screen on a particular website, the user then selects (e.g., using a mouse, finger, stylus, etc.) the username entry box. This selection allows a user to enter their username in order to log into the website.

If the data entry field is determined not to be active, an embodiment will take no action at 440. Alternatively, if the data entry field is determined to be currently active at 430, an embodiment may then detect if a stylus is present at 450. This detection may be done via any known way. For example, a Bluetooth stylus may be used to communicate with a tablet device. BLUETOOTH is a registered trademark of Bluetooth Sig, Inc. in the United States of America and other countries. Alternatively, the touch surface may contain a digitizer layer which can detect specific stylus types (e.g., digitizer stylus) within a predetermine distance. A further embodiment may require the stylus to physically contact the touch surface prior to detecting it.

Once detection is complete, an embodiment may determine if the stylus is within a predetermined range at 460. For example, as a user brings the stylus closer to the touch surface in an attempt to enter handwriting input. This enables an embodiment to anticipate that handwriting input is likely to be entered. The stylus location may also be used to determine which if any of the data fields are active. For example, if a user hovers a digitizer stylus over a specific data entry field, an embodiment could assume that imminent input was about to take place within that data field and thus select it as the active data field. If it is determined that the stylus never enters the predetermined range, an embodiment may take no action at 470. It should be noted that these steps are not required to take place with in a predetermined time frame. An embodiment may detect a data entry field is active and then wait an undetermined period for time before determining that a stylus is also within the predetermined range.

However, if it is determined that a stylus is within the predetermined range at 460 the embodiment will prevent an onscreen keyboard from being displayed at 480. Once the OSK is prevented from being displayed, as previously stated, a user may freely interact with the application or data entry fields they desire, and the hand writing input may then be converted into machine text and inserted into an active data field.

Accordingly, as illustrated by the example embodiments and figures, an embodiment detects if an input application is running on a device. Then, the embodiment detects if a data entry field exists within the currently active program or document. Additionally, the embodiment will detect if any of the data entry fields are currently active (e.g., selected). Then, based on this determination, the embodiment may prevent an onscreen keyboard from being displayed.

The various embodiments described herein thus represent a technical improvement to the ability of a user to enter data into their devices. Specifically through the user of detecting data entry fields and detecting the presence of a stylus or data entry tool. If both detections are successful, it can be assumed that a user is in the process of entering data via the stylus into the active data entry field. Thus, enhancing the user experience by not displaying a onscreen keyboard which reduces the overall screen real estate, and can make program navigation difficult.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using a processor, an input method editor application is running on a device;
    detecting, using a touch surface, a stylus is within a predetermined hover range of the touch surface, wherein the predetermined hover range corresponds to a range above the touch surface;
    detecting, using a processor, a data entry field is active; and
    responsive to detecting the input method editor application is running, the stylus is within a predetermined hover range of the touch surface, and the data entry field is active, automatically suppressing, using a processor and without additional user input, an on screen keyboard from being displayed on a display device.

2. The method of claim 1, wherein the suppressing is further responsive to determining if, based on the data entry field activation, an on screen keyboard is to be displayed on the display device.

3. The method of claim 1, further comprising, accepting, on a touch surface, hand writing input;
converting, using a processor, the hand writing input into machine text; and
entering, using a processor, the machine text into the active data entry field.

4. The method of claim 1, wherein the suppressing comprises preventing the on screen keyboard from being displayed on the display device.

5. The method of claim 1, wherein input method editor application is a hand writing recognition application.

6. The method of claim 1, wherein the predetermined range comprises the stylus touching the touch surface.

7. The method of claim 1, wherein the touch surface comprises a digitizer layer; and
wherein the stylus is a digitizer stylus.

8. The method of claim 1, wherein the data entry field is activated via detecting, using a touch surface, a location of a stylus.

9. The method of claim 1, wherein the hand writing recognition application is an application independent of the operating system.

10. An information handling device, comprising:
a processor;
a memory device that stores instructions executable by the processor to:
detect an input method application is running on a device;
detect a stylus is within a predetermined hover range of the touch surface, wherein the predetermined hover range corresponds to a range above the touch surface;
detect a data entry field is active; and
responsive to detecting the input method editor application is running, the stylus is within a predetermined hover range of the touch surface, and the data entry field is active, automatically suppress, without additional user input, an on screen keyboard from being displayed on a display device.

11. The information handling device of claim 10, wherein the suppressing is further responsive to determining if, based on the data entry field activation, an on screen keyboard is to be displayed on the display device.

12. The information handling device of claim 10, wherein the instructions are further executable by the processor to:
accept, on a touch surface, hand writing input;
convert the hand writing input into machine text; and
enter the machine text into the active data entry field.

13. The information handling device of claim 12, wherein the suppressing comprises preventing the on screen keyboard from being displayed on the display device.

14. The information handling device of claim 10, wherein input method editor application is a hand writing recognition application.

15. The information handling device of claim 10, wherein the touch surface comprises:
a digitizer layer, and wherein the stylus is a digitizer stylus.

16. The information handling device of claim 10, wherein the data entry field is activated via detecting, using a touch surface, a location of a stylus.

17. The information handling device of claim 10, wherein the hand writing recognition application is an application independent of the operating system.

18. A product, comprising:
a processor; and
a storage device having code stored therewith, which when executable by the processor to cause the processor to perform operations comprising:
detecting an input method editor application is running on a device;
detecting a stylus is within a predetermined hover range of the touch surface, wherein the predetermined hover range corresponds to a range above the touch surface;
detecting a data entry field is active; and
responsive to detecting the input method editor application is running, the stylus is within a predetermined hover range of the touch surface, and the data entry field is active, automatically suppressing, without additional user input, as on screen keyboard from being displayed on a display device.

* * * * *